Figure 1:

(No Model.)

E. B. CALL.
ABRADING DISK.

No. 266,346. Patented Oct. 24, 1882.

Witnesses,
I. W. Wells.
J. M. Morse.

Inventor,
Edward B. Call,
per A. B. Upham,
Attorney.

UNITED STATES PATENT OFFICE.

EDWARD B. CALL, OF PEORIA, ILLINOIS.

ABRADING-DISK.

SPECIFICATION forming part of Letters Patent No. 266,346, dated October 24, 1882.

Application filed May 17, 1882. (No model.)

*To all whom it may concern:*

Be it known that I, EDWARD B. CALL, of Peoria, in the county of Peoria and State of Illinois, have invented an Improved Abrading-Disk; and I do hereby declare that the following is a full, clear, and exact description thereof, reference being had to the annexed drawing, making a part of this specification, in which like letters of reference refer to like parts, and in which the figure represents a cross-section through the center of the disk.

My invention is in that line of grinding-disks for dental purposes in which the abrading is to be done upon the contiguous sides of teeth. This obliges the disk to be of course very thin, making a solid wheel compounded of shellac and corundum impracticable. As corundum as ordinarily applied cannot be made to adhere well to a thin metal disk, I have devised the following process and construction for a thin abrading-disk.

I take a thin steel disk and oxidize somewhat deeply one side. This process of oxidation is substantially as follows: Having coated one surface of my steel disk with varnish or wax, I put said disk into acid—nitro-muriatic acid preferred—and retain it therein until its uncovered side has been sufficiently eaten in to produce the desired degree of roughness. Salt and water I also use for this same purpose of oxidation; but it is not as as rapid in its work as the aqua regia just described. When manufacturing these disks in quantities I corrode in a similar way one surface of a large sheet of steel and stamp subsequently therefrom the disks. As I desire a disk that shall grind with one surface only, that there may be no danger of abrading the wrong tooth, I polish the unoxidized surface of the disk. The purpose of oxidizing the face of the steel is to make a thoroughly rough surface, to which shellac or other cements can firmly adhere. Other metals can also be used for the disks; but I prefer steel, on account of being thus able to produce a corrugated surface so easily and thoroughly by means of oxidation. No mechanical means can equal this chemical way for roughening the face of the disk.

To produce an abrading coating for my thin metal disk, I mix soft rubber and corundum, shape it into a thin disk of the same diameter as my metal one, and by the well-known process of vulcanizing transform the soft rubber of the same into hard rubber. When shaping this mixed disk I spread it, when soft, upon a strip of fine silk or other similar fabric. The hard-rubber and corundum disk is left, when said silk is removed, with its surface finely corrugated.

In manufacturing my abrading-disks in quantities I make broad thin sheets of rubber and corundum hardened and corrugated in a similar way, and stamp the disks therefrom afterward. Said corrugated surface of the rubber disk and the oxidized surface of the steel disk I coat thinly with a solution of shellac and alcohol mixed to the consistency of sirup, place said surfaces together, and put the united disks in a vise heated to about 310°. After a sufficient degree of pressure has been applied to said disks through the said heated vise the two united disks coalesce as one without the possibility of disruption, except upon the application of heat.

Instead of always uniting the disks of steel and corundum separately, I often cement together the unstamped sheet of the corrugated rubber and corundum and the oxidized unstamped sheet of steel, and then, when they are firmly set, stamp the completed disks therefrom. I now, therefore, have as the result of this process and construction a thin disk, one side of which is of smooth metal and the other a compact abrading-surface.

To make an abrading-disk for work where more rapidity of grinding is desired, I omit the rubber and make the coating-mixture for the metal disk of shellac and corundum. The process of roughening the surfaces and cementing them together is otherwise, however, similar to that just described.

Diamond-dust and other abrading substances can be used in the place of corundum; but the latter I find generally preferable.

What I claim as my invention, and for which I desire Letters Patent, is as follows, to wit:

1. The herein-described process of forming abraidng-disks for dental purposes, consisting of producing a corrugated surface upon a vulcanized disk of rubber and some hard powder and cementing said surface to the roughened surface of a metal disk, substantially as set forth.

2. The herein-described process of forming abrading-disks, consisting of producing a corrugated surface upon a vulcanized disk of rubber and corundum, oxidizing the surface of a steel disk, and cementing the two roughened surfaces together.

3. As an article of manufacture, a grinding-plate consisting of a thin layer of hard rubber mixed with some abrading-powder, cemented to the oxidized surface of a steel plate, substantially as and for the purpose specified.

4. A grinding-disk consisting of a thin disk of hard rubber mixed with corundum and cemented to the oixdized surface of a steel disk.

5. An abrading-disk consisting of a thin disk of some easily-fusible substance mixed with a gritty powder and cemented to the oxidized surface of a steel disk.

In testimony that I claim the foregoing invention I have hereunto set my hand this 5th day of May, 1882.

EDWARD B. CALL.

Witnesses:
H. W. WELLS,
RICHD. A. GOLDSBROUGH.